US010095361B2

(12) United States Patent
Mishalov

(10) Patent No.: US 10,095,361 B2
(45) Date of Patent: Oct. 9, 2018

(54) STYLUS DETECTION WITH CAPACITIVE BASED DIGITIZER SENSOR

(71) Applicant: Microsoft Technology Licensing, LLC, Redmond, WA (US)

(72) Inventor: Vadim Mishalov, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 48 days.

(21) Appl. No.: 15/070,380

(22) Filed: Mar. 15, 2016

(65) Prior Publication Data

US 2016/0274700 A1   Sep. 22, 2016

Related U.S. Application Data

(60) Provisional application No. 62/134,613, filed on Mar. 18, 2015.

(51) Int. Cl.
G06F 3/044 (2006.01)
G06F 3/0354 (2013.01)
G06F 3/041 (2006.01)

(52) U.S. Cl.
CPC .......... *G06F 3/044* (2013.01); *G06F 3/03545* (2013.01); *G06F 3/0418* (2013.01); *G06F 2203/04104* (2013.01)

(58) Field of Classification Search
CPC .... G06F 3/0418; G06F 3/044; G06F 3/03545; G06F 2203/04104
See application file for complete search history.

(56) References Cited

U.S. PATENT DOCUMENTS 4,398,720 A  8/1983 Jones et al.
4,591,710 A  5/1986 Komadina et al.
(Continued)

FOREIGN PATENT DOCUMENTS

EP  0684580  11/1995
EP  1422601  5/2004
(Continued)

OTHER PUBLICATIONS

Applicant-Initiated Interview Summary dated May 2, 2017 From the US Patent and Trademark Office Re. U.S. Appl. No. 13/892,381. (3 pages).

(Continued)

*Primary Examiner* — Kwang-Su Yang

(57) ABSTRACT

A method for detecting a signal transmitted by a handheld device includes detecting a signal on first electrodes along a first axis and on second electrodes along a second axis of the digitizer sensor. The method additionally includes detecting hand input on the first electrodes and on third electrodes along the second axis and detecting no hand input on the second electrodes. The hand input detection is based on self-capacitive detection. The signal transmitted by the handheld device on the first electrodes is estimated based on the hand input detected on each of the first and third electrodes, the signal from the handheld device detected on the second electrodes and based on a pre-defined constant. Coordinates of the handheld device are determined based on the signal detected on the second electrodes and the signal estimated. The coordinates are reported to a host computing device associated with the digitizer sensor.

13 Claims, 6 Drawing Sheets

(56) References Cited

U.S. PATENT DOCUMENTS

| | | |
|---|---|---|
| 4,672,154 A | 6/1987 | Rodgers et al. |
| 4,686,332 A | 8/1987 | Greanias et al. |
| 4,707,845 A | 11/1987 | Krein et al. |
| 4,791,592 A | 12/1988 | Burgess |
| 4,977,397 A | 12/1990 | Kuo et al. |
| 5,117,071 A | 5/1992 | Greanias et al. |
| 5,129,654 A | 7/1992 | Bogner |
| 5,239,139 A | 8/1993 | Zuta |
| 5,528,002 A | 6/1996 | Katabami |
| 5,543,588 A | 8/1996 | Bisset et al. |
| 5,574,262 A | 11/1996 | Petty |
| 5,691,512 A | 11/1997 | Obi |
| 5,825,345 A | 10/1998 | Takahama et al. |
| 5,831,600 A | 11/1998 | Inoue et al. |
| 5,841,078 A | 11/1998 | Miller et al. |
| 5,854,881 A | 12/1998 | Yoshida et al. |
| 5,859,392 A | 1/1999 | Petty |
| 5,889,511 A | 3/1999 | Ong et al. |
| 5,905,489 A | 5/1999 | Takahama et al. |
| 5,923,320 A | 7/1999 | Murakami et al. |
| 5,973,676 A | 10/1999 | Kawakura |
| 6,020,849 A | 2/2000 | Fukuzaki |
| 6,081,259 A | 6/2000 | Teterwak |
| 6,229,529 B1 | 5/2001 | Yano et al. |
| 6,239,389 B1 | 5/2001 | Allen et al. |
| 6,417,846 B1 | 7/2002 | Lee |
| 6,459,424 B1 | 10/2002 | Resman |
| 6,690,156 B1 | 2/2004 | Weiner et al. |
| 6,888,536 B2 | 5/2005 | Westerman et al. |
| 7,248,249 B2 | 7/2007 | Kong et al. |
| 7,292,229 B2 | 11/2007 | Morag et al. |
| 7,372,455 B2 | 5/2008 | Perski et al. |
| 7,656,396 B2 | 2/2010 | Bosch et al. |
| 7,843,439 B2 | 11/2010 | Perski et al. |
| 7,868,874 B2 | 1/2011 | Reynolds |
| 7,995,036 B2 | 8/2011 | Perski et al. |
| 8,059,102 B2 | 11/2011 | Rimon et al. |
| 8,278,571 B2 | 10/2012 | Orsley |
| 8,289,289 B2 | 10/2012 | Rimon et al. |
| 8,402,391 B1 | 3/2013 | Doray et al. |
| 8,482,545 B2 | 7/2013 | King-Smith et al. |
| 8,542,210 B2 | 9/2013 | Westerman |
| 8,660,978 B2 | 2/2014 | Hinckley et al. |
| 8,810,542 B2 | 8/2014 | Yousefpor |
| 8,994,692 B2 | 3/2015 | Yumoto et al. |
| 9,262,010 B2 | 2/2016 | Bulea |
| 9,367,168 B2 | 6/2016 | Ahn et al. |
| 9,626,020 B2 | 4/2017 | Durojaiye et al. |
| 9,632,622 B2 | 4/2017 | Hotelling et al. |
| 2002/0089491 A1 | 7/2002 | Willig |
| 2003/0080946 A1 | 5/2003 | Chuang |
| 2004/0027340 A1 | 2/2004 | Muraoka et al. |
| 2004/0100450 A1 | 5/2004 | Choi |
| 2004/0155871 A1 | 8/2004 | Perski et al. |
| 2004/0160426 A1 | 8/2004 | DeGroot et al. |
| 2004/0178995 A1 | 9/2004 | Sterling |
| 2005/0189154 A1 | 9/2005 | Perski et al. |
| 2005/0271259 A1 | 12/2005 | Lorch et al. |
| 2006/0012580 A1 | 1/2006 | Perski et al. |
| 2006/0017709 A1 | 1/2006 | Okano |
| 2006/0109252 A1 | 5/2006 | Kolmykov-Zotov et al. |
| 2006/0139339 A1 | 6/2006 | Pechman et al. |
| 2007/0152976 A1 | 7/2007 | Townsend et al. |
| 2007/0285404 A1 | 12/2007 | Rimon et al. |
| 2008/0012835 A1 | 1/2008 | Rimon et al. |
| 2008/0012838 A1 | 1/2008 | Rimon |
| 2008/0128180 A1 | 6/2008 | Perski et al. |
| 2008/0238885 A1 | 10/2008 | Zachut et al. |
| 2009/0095540 A1 | 4/2009 | Zachut et al. |
| 2009/0160787 A1 | 6/2009 | Westerman et al. |
| 2009/0251434 A1 | 10/2009 | Rimon et al. |
| 2009/0273579 A1* | 11/2009 | Zachut .................. G06F 3/044 345/174 |
| 2010/0060608 A1 | 3/2010 | Yousefpor |
| 2010/0155153 A1 | 6/2010 | Zachut |
| 2010/0289752 A1 | 11/2010 | Birkler |
| 2010/0321338 A1 | 12/2010 | Ely |
| 2011/0012840 A1 | 1/2011 | Hotelling et al. |
| 2011/0012855 A1 | 1/2011 | Yeh et al. |
| 2011/0084929 A1 | 4/2011 | Chang et al. |
| 2011/0155479 A1 | 6/2011 | Oda et al. |
| 2011/0175835 A1 | 7/2011 | Wang |
| 2011/0254802 A1 | 10/2011 | Philipp |
| 2011/0254807 A1 | 10/2011 | Perski et al. |
| 2011/0285654 A1* | 11/2011 | Park .................. G06F 3/0418 345/173 |
| 2011/0291944 A1 | 12/2011 | Simmons et al. |
| 2011/0310040 A1 | 12/2011 | Ben-Shalom et al. |
| 2012/0050180 A1 | 3/2012 | King et al. |
| 2012/0105362 A1 | 5/2012 | Kremin et al. |
| 2012/0133616 A1 | 5/2012 | Nishihara et al. |
| 2012/0158629 A1 | 6/2012 | Hinckley et al. |
| 2012/0182238 A1 | 7/2012 | Lee |
| 2012/0249457 A1 | 10/2012 | Chou et al. |
| 2013/0009896 A1 | 1/2013 | Zaliva |
| 2013/0009907 A1 | 1/2013 | Rosenberg et al. |
| 2013/0027361 A1 | 1/2013 | Perski et al. |
| 2013/0127757 A1* | 5/2013 | Mann .................. G06F 3/041 345/173 |
| 2013/0132903 A1 | 5/2013 | Krishnaswamy |
| 2013/0176280 A1 | 7/2013 | Wu et al. |
| 2013/0249950 A1 | 9/2013 | Mahmoud et al. |
| 2013/0278543 A1 | 10/2013 | Hsu et al. |
| 2013/0285973 A1 | 10/2013 | Elias et al. |
| 2013/0300672 A1 | 11/2013 | Griffin |
| 2013/0300696 A1 | 11/2013 | Haran et al. |
| 2013/0328832 A1 | 12/2013 | Boumgarten |
| 2014/0152620 A1 | 6/2014 | Perski et al. |
| 2014/0168116 A1 | 6/2014 | Sasselli et al. |
| 2014/0320445 A1 | 10/2014 | Kim |
| 2015/0049044 A1 | 2/2015 | Yousefpor et al. |
| 2015/0070310 A1 | 3/2015 | Suzuki et al. |
| 2015/0109243 A1 | 4/2015 | Jun et al. |
| 2015/0193025 A1 | 7/2015 | Rebeschi et al. |
| 2016/0041685 A1 | 2/2016 | Perski et al. |
| 2016/0253033 A1* | 9/2016 | Omelchuk .............. G06F 3/044 345/174 |
| 2017/0177110 A1 | 6/2017 | Winebrand et al. |
| 2017/0177138 A1 | 6/2017 | Orlovsky et al. |
| 2017/0242520 A1 | 8/2017 | Winebrand |

FOREIGN PATENT DOCUMENTS

| | | |
|---|---|---|
| EP | 1717677 | 11/2006 |
| JP | 05-173698 | 7/1993 |
| JP | 07-311647 | 11/1995 |
| JP | 09-325852 | 12/1997 |
| JP | 10-031545 | 2/1998 |
| JP | 2002-207563 | 7/2002 |
| TW | 201537442 | 10/2015 |
| WO | WO 03/019346 | 3/2003 |
| WO | WO 2005/081631 | 9/2005 |
| WO | WO 2009/108334 | 9/2009 |
| WO | WO 2011/154950 | 12/2011 |
| WO | WO 2012/111010 | 8/2012 |
| WO | WO 2012/140656 | 10/2012 |
| WO | WO 2013/171747 | 11/2013 |
| WO | WO 2014/145872 | 9/2014 |

OTHER PUBLICATIONS

International Search Report and the Written Opinion dated Apr. 11, 2017 From the International Searching Authority Re. Application No. PCT/US2016/066737. (14 Pages).

Advisory Action Before the Filing of an Appeal Brief dated Sep. 29, 2016 From the US Patent and Trademark Office Re. U.S. Appl. No. 13/892,381.

International Search Report and the Written Opinion dated Jun. 3, 2016 From the International Searching Authority Re. Application No. PCT/US2016/022760.

Official Action dated Jul. 8, 2016 From the US Patent and Trademark Office Re. U.S. Appl. No. 13/892,381.

(56) References Cited

OTHER PUBLICATIONS

Official Action dated Dec. 30, 2016From the US Patent and Trademark Office Re. U.S. Appl. No. 13/892,381. (24 pages).
Park et al. "A Pen-Pressure-Sensitive Capacitive Touch System Using Electrically Coupled Resonance Pen", IEEE Journal of Solid-State Circuits, 51(1): 168-176, Jul. 30, 2015.
Applicant-Initiated Interview Summary dated Jul. 19, 2017 From the US Patent and Trademark Office Re. U.S. Appl. No. 14/977,766. (3 pages).
Official Action dated Jun. 14, 2017 From the US Patent and Trademark Office Re. U.S. Appl. No. 13/892,381. (26 pages).
International Preliminary Report on Patentability dated Jun. 6, 2017 From the International Preliminary Examining Authority Re. Application No. PCT/US2016/022760. (9 Pages).
Official Action dated Jun. 1, 2017 From the US Patent and Trademark Office Re. U.S. Appl. No. 14/977,766. (35 Pages).
Official Action dated Jun. 2, 2017 From the US Patent and Trademark Office Re. U.S. Appl. No. 14/977,721. (38 Pages).
Official Action dated Apr. 3, 2017 From the US Patent and Trademark Office Re. U.S. Appl. No. 15/050,656. (23 pages).
Written Opinion dated Feb. 1, 2017 From the International Preliminary Examining Authority Re. Application No. PCT/US2016/022760. (8 Pages).
International Search Report and the Written Opinion dated May 23, 2006 From the International Searching Authority Re.: Application No. PCT/IL05/00229.
Communication Pursuant to Article 94(3) EPC dated Nov. 13, 2012 From the European Patent Office Re. Application No. 05709125.8.
Communication Pursuant to Article 94(3) EPC dated May 15, 2014 From the European Patent Office Re. Application No. 05709125.8.
Communication Pursuant to Article 94(3) EPC dated Jul. 19, 2012 From the European Patent Office Re. Application No. 05709125.8.
Communication Pursuant to Article 94(3) EPC dated Jun. 20, 2013 From the European Patent Office Re. Application No. 05709125.8.
Communication Pursuant to Article 94(3) EPC dated Nov. 22, 2013 From the European Patent Office Re. Application No. 05709125.8.
Communication Relating to the Results of the Partial International Search dated Sep. 4, 2013 From the International Searching Authority Re. Application No. PCT/IL2013/050417.
Decision to Refuse a European Patent Application (Article 97(2) EPC) dated Jul. 3, 2015 From the European Patent Office Re. Application No. 05709125.8.
International Preliminary Report on Patentability dated Nov. 27, 2014 From the International Bureau of WIPO Re. Application No. PCT/IL2013/050417.
International Search Report and the Written Opinion dated Dec. 20, 2013 From the International Searching Authority Re. Application No. PCT/IL2013/050417.
Official Action dated Jun. 5, 2012 From the US Patent and Trademark Office Re. U.S. Appl. No. 13/171,601.
Official Action dated Oct. 5, 2015 From the US Patent and Trademark Office Re. U.S. Appl. No. 13/892,381.
Official Action dated Dec. 8, 2009 From the US Patent and Trademark Office Re.: U.S. Appl. No. 11/063,535.
Official Action dated Jan. 13, 2016 From the US Patent and Trademark Office Re. U.S. Appl. No. 13/892,381.
Official Action dated Nov. 15, 2011 From the US Patent and Trademark Office Re. U.S. Appl. No. 13/171,601.
Official Action dated Mar. 18, 2015 From the US Patent and Trademark Office Re. U.S. Appl. No. 13/892,381.
Official Action dated Dec. 22, 2010 From the US Patent and Trademark Office Re.: U.S. Appl. No. 11/063,535.
Official Action Dated May 25, 2010 From the US Patent and Trademark Office Re.: U.S. Appl. No. 11/063,535.
Official Action dated May 27, 2009 From the US Patent and Trademark Office Re.: U.S. Appl. No. 11/063,535.
Official Action dated Mar. 28, 2013 From the US Patent and Trademark Office Re. U.S. Appl. No. 13/644,331.
Summons to Attend Oral Proceedings Pursuant to Rule 115(1) EPC dated Dec. 15, 2014 From the European Patent Office Re. Application No. 05709125.8.
Supplementary European Search Report dated Mar. 27, 2012 From the European Patent Office Re. Application No. 05709125.8.
Translation of Decision of Rejection dated Jun. 2, 2011 From the Japanese Patent Office Re.: Application No. 2007-500353.
Translation of Notification of Reasons of Rejection dated May 21, 2010 From the Japanese Patent Office Re.: Application No. 2007-500353.
Wang et al. "Detecting and Leveraging Finger Orientation for Interaction with Direct-Touch Surfaces", UIST '09 Proceedings of the 22nd Annual ACM Symposium on User Interface Software and Technology: 23-32, Jul. 4, 2009.
Hughes "Apple's Stylus Receiver Concept Would Improve the Precision of Digital Pen-Based Input", Follow AppleInsider, Quiller Media, 8 P., Jan. 29, 2015.

* cited by examiner

STYLUS DETECTION WITH CAPACITIVE BASED DIGITIZER SENSOR

RELATED APPLICATION

This application claims the benefit of priority under 35 USC 119(e) of U.S. Provisional Patent Application No. 62/134,613 filed on Mar. 18, 2015, the contents of which are incorporated herein by reference in their entirety.

BACKGROUND

Digitizer sensors are used for touch detection in many Human Interface Devices (HID) such as laptops, track-pads, MP3 players, computer monitors, and smart-phones. Capacitive sensors are one type of digitizer sensor. The capacitive sensor senses positioning and proximity of a conductive object such as a conductive stylus or finger used to interact with the HID. The capacitive sensor is often integrated with an electronic display to form a touch-screen. Capacitive sensors include antennas or lines constructed from different media, such as copper, Indium Tin Oxide (ITO) and printed ink. ITO is typically used to achieve transparency. Some capacitive sensors are grid based and operate to detect either mutual capacitance between electrodes at different junctions in the grid or to detect self-capacitance at lines of the grid. Finger touch interaction may be tracked based on a mutual capacitive or self-capacitive detection method. Mutual capacitive detection is typically used for tracking more than one finger touch interaction at a time.

Signal emitting styluses, e.g. active styluses, are known in the art for use with a digitizer sensor. Position of the stylus is tracked by picking on a signal emitted by the stylus with the digitizer sensor. Some active styluses emit a signal that includes information. A circuit associated with the digitizer sensor may decode and report the information to the HID. Some digitizer sensors are operated to track both finger touch input as well input from a signal emitting stylus.

SUMMARY

A system and method is provided for tracking coordinates of a signal emitting stylus interacting with a digitizer sensor in the face of interferences that may occur while a hand is touching the digitizer sensor. While a user provides input on a digitizer sensor with a stylus, the user often touches the digitizer sensor with a finger(s) or hand. The interferences that are introduced are typically due to an inherent difference in the grounding states of the stylus and the touch enabled device. A signal transmitted by a stylus and picked up by a digitizer sensor may be drained onto a hand, e.g. a hand touching the digitizer sensor due to the differences in the grounding state. The drained signal may then couple all sensing electrodes coupled to the hand. Typically, the signal drained onto the finger is coupled back onto the digitizer sensor with an anti-phase or phase shift close to an anti-phase. This parasitic current path may be destructive to the original stylus signal picked up by the digitizer sensor by significantly reducing energy of the stylus signal picked up by the digitizer system and may also smear the signal originating from the stylus over a plurality of sensing electrodes. While operating the stylus for inking on a display of a touch enabled device, interferences caused by the hand may lead to an unexpected lack of inking or may lead to inaccurate inking.

According to some exemplary embodiments, the system and method provides for identifying such interferences and compensating for them. The compensation may improve the accuracy in detecting coordinates of the stylus. The system and method described herein may also be applied to tracking coordinates of other handheld devices that transmit a signal to be tracked by the digitizer sensor.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Typically, when a hand introduces interference on sensor lines carrying a stylus signal, the interference may appear on one axis of the digitizer sensor, e.g. on either the row or column axis of a grid based digitizer sensor and not on both. The interference occurs due to a hand coupling with a sensing line carrying a stylus signal. Since the hand is distanced from the stylus tip location and spans over only a few sensor lines, the touch area is often not large enough to span sensor lines from both axes that carry the stylus signal. The methods described herein apply to such occurrences.

According to some embodiments of the present disclosure, stylus input on an axis including interference is estimated with stylus based output from the axis without the interference, finger based output detected from both axes during self-capacitive detection and a pre-defined inter axis impedance ratio. According to some exemplary embodiments, the pre-defined ratio may be defined based on accumulated empirical data detected while a hand is coupled to sensing lines along one axis that carry a stylus signal and not coupled to sensing lines along the other axis that carry a stylus signal. Optionally, the ratio relates output detected during stylus detection and corresponding output detected during self-capacitive detection. Typically, the stylus signal output used for the ratio is peak energy detected on one axis over an array of energies detected on the other axis. Similarly, finger output used to define the ratio is the peak energy detected on one axis over an array of energies detected on the other axis during self-capacitive detection.

The ratio may be defined for a specific touch enabled computing device and may vary based on size and make of the device. Typically, the difference in grounding states may be related to the weight of the stylus as compared to the touch enabled device. The ratio may also be defined for specific stylus or for a specific user. More than one ratio may be defined and stored in the touch enabled device, e.g. in touch controller of the digitizer system. Optionally, a current grounding state of the device may be detected and the ratio may be adjusted based on the detected grounding state. The grounding state of the device may vary for example by plugging the device to a wall outlet, holding a chassis of the device.

Figure 1:
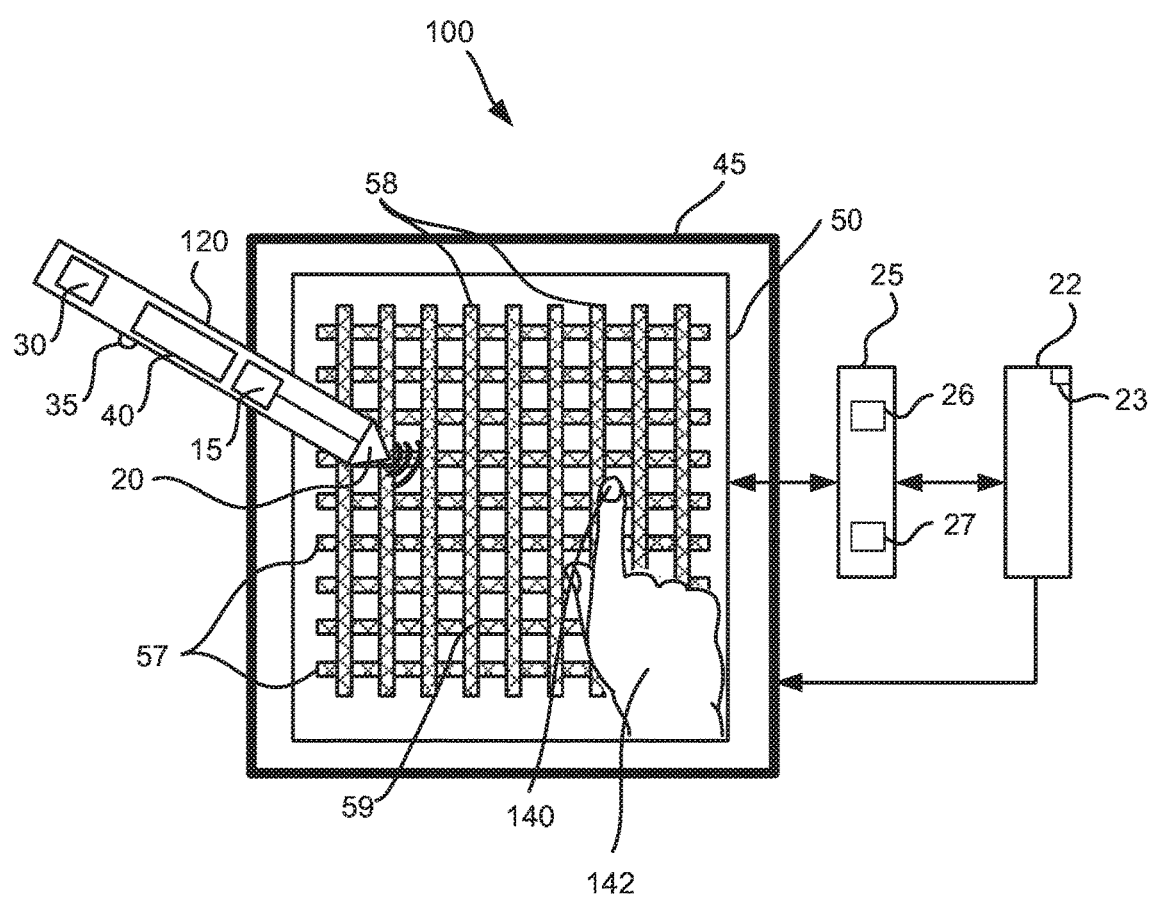
FIG. 1 is a simplified block diagram of an exemplary touch and stylus enabled computing device in accordance with some embodiments of the present disclosure.

Reference is now made to FIG. 1 showing a simplified block diagram of an exemplary touch and stylus enabled computing device in accordance with some embodiments of the present disclosure. According to some embodiments of the present disclosure, a computing device 100 includes a display 45 that is integrated with a digitizer sensor 50. In some exemplary embodiments, digitizer sensor 50 is a grid based capacitive sensor formed with row conductive strips 57 (e.g. sensor lines) and column conductive strips 58 (e.g. sensor lines) forming grid lines of the grid based sensor. Typically, the conductive strips are electrically insulated from one another and each of the conductive strips (row conductive strips 57 and column conductive strips 58) is connected at least on one end to circuit 25, e.g. touch controller. Typically, the conductive strips are arranged to enhance capacitive coupling between row conductive strips 57 and column conductive strips 58, e.g. around junctions 59 formed between rows and columns. The capacitive coupling formed between row conductive strips 57 and column conductive strips 58 is sensitive to presence of conductive and dielectric objects. Alternatively, digitizer sensor 50 is formed with a matrix of electrode junctions 59 that is not necessarily constructed based on row conductive strips 57 and column conductive strips 58.

According to some embodiments of the present disclosure, the conductive strips are operative to detect touch of one or more fingertips 140 or hand 142 or other conductive objects (finger based detection) as well as input by stylus 120 transmitting an electromagnetic signal typically via the writing tip 20 of stylus 120 (stylus based detection). Circuit 25 manages and controls the finger based detection and the stylus based detection. Typically, both the finger based detection and the stylus based detection is performed during each refresh cycle of circuit 25 but in separate sampling windows. Digitizer sensor 50 and circuit 25 together form a digitizer system.

During finger based detection, circuit 25 may apply mutual capacitive detection or a self-capacitive detection for sensing a capacitive effect due to touch (or hover) of fingertip 140, hand 142 or other conductive objects. Typically, during mutual capacitive detection and self-capacitive detection, circuit 25 sends a triggering signal, e.g. pulse to one or more conductive strips of digitizer sensor 50 and samples output from the conductive strips in response to the triggering and/or interrogation. For mutual capacitive detection, some or all of conductive strips along one axis of the grid are triggered simultaneously or in a consecutive manner, and in response to each triggering, outputs from the conductive strips on the other axis are sampled. Mutual capacitive detection provides for detecting coordinates multiple fingertips 140 touching sensor 50 at the same time (multi-touch).

For self-capacitive detection, all the conductive strips may be triggered simultaneously and in response to the triggering, outputs from all the conductive strips may be sampled. Self-capacitive detection provides for detecting all conductive strips that are coupled with the interacting finger 140 or hand 1442. Circuit 25 typically includes finger detection engine 26 for managing finger based detection including transmitting the triggering signal, processing the touch signal and tracking coordinates of one or more fingertips 140, hand 142 or other conductive objects.

During stylus based detection, output from both row conductive strips 57 and column conductive strips 58 are sampled to detect a signal transmitted by stylus 120 and determine coordinates of stylus 120. Circuit 25 typically includes a stylus detection engine 27 that may perform synchronization with stylus 120, process signals received by stylus 120, and track coordinates of stylus 120.

In some exemplary embodiments, stylus 120 operates by periodically transmitting a beacon signal that may be picked up by digitizer sensor 50. Synchronization between stylus 120 and circuit 25 (stylus detection engine 27) provides for matching sampling periods of circuit 25 to transmission periods of stylus 120. In some exemplary embodiments, stylus 120 is pressure sensitive, e.g. includes a pressure sensor 15 associated with tip 20 for sensing pressure applied on tip 20 and may also transmit information regarding pressure applied on tip 20. The pressure information may be encoded on the beacon signal or may be separate burst signal. Stylus 120 may also periodically transmit other information directly related to stylus 120, related to an environment around the stylus 120, to a user using stylus 120, to privileges allotted to the stylus 120, capabilities of stylus 120, or information received from a third party device. Additional information related to the stylus may include indications of a pressed button(s) 35, tilt, identification, manufacturer, version, media access control (MAC) address, and stored configurations such as color, tip type, brush, and add-ons.

Typically, stylus 120 includes an ASIC 40 that controls generation of a signal emitted by stylus 120. ASIC 40 typically encodes information generated, stored or sensed by stylus 120 on the signal transmitted by stylus 120. Typically, stylus detection engine 27 decodes information received from stylus 120. Optionally, other handheld devices configured to interact with digitizer sensor 50 may be operated in a manner similar to stylus 120 and may be tracked by stylus detection engine 27.

Typically, output from circuit 25 is reported to host 22. Typically, the output provided by circuit 25 may include coordinates of one or more fingertips 140, coordinates of writing tip 20 of stylus 120, a pen-up or pen-down status of tip 20, pressure applied on tip 20 and additional information provided by stylus 120, e.g. pressure, tilt, and battery level. Typically, circuit 25 uses both analog and digital processing to process signals detected with digitizer sensor 50. Optionally, some and/or all of the functionalities of engines 26 and 27 are integrated in one or more processing units adapted for controlling operation of digitizer sensor 50. Optionally, some and/or all of the functionalities of circuit 25, engines 26 and 27 are integrated and/or included in host 22. Host 22 may transmit the information to an application manager or a relevant application. Optionally, circuit 25 and host 22 may transfer the raw information to an application. The raw information may be analyzed or used as needed by the application. At least one of stylus 120, circuit 25 and host 22 may pass on the raw information without analysis or being aware of the information.

According to some exemplary embodiments, stylus 120 additionally includes a wireless communication unit 30, e.g. an auxiliary channel with Bluetooth communication, near field communication (NFC), radio frequency (RF) communication that communicates with module 23 of host 22 for passing information between stylus 120 and host 22.

Figure 2:
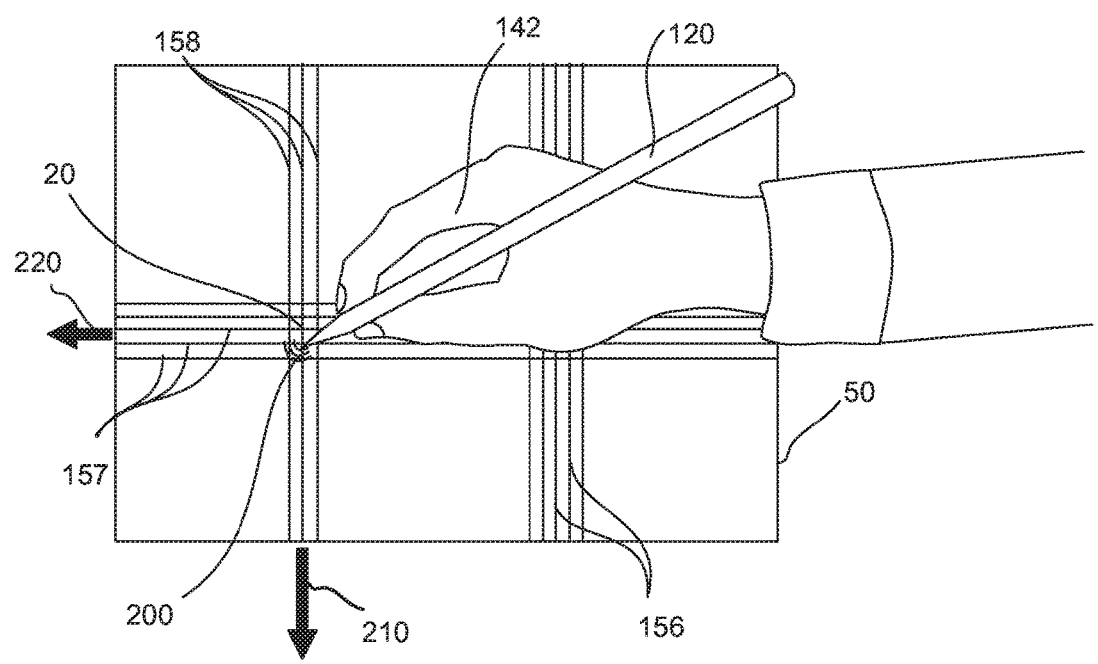
FIG. 2 is a schematic drawing illustrating a hand touching the digitizer sensor while holding a stylus that is interacting with the digitizer sensor in accordance with some embodiments of the present disclosure.

Reference is now made to FIG. 2 showing a schematic drawing illustrating a hand touching the digitizer sensor while holding a stylus that is interacting with the digitizer sensor in accordance with some embodiments of the present disclosure. While a user holds a stylus 120, a signal 200 transmitted via tip 20 is detected on one or more row conductive strips 157 and one or more column conductive strips 158. Hand 142 holding stylus 120 may overlap some of the conductive strips that are picking up stylus signal 200, e.g. conductive strips 157. Often hand 142 may be positioned in relationship to tip 20 so that hand 142 overlaps conductive strips 157 that also carry a stylus signal along a first axis of the digitizer sensor 50 e.g. the row axis and not conductive strips 158 carrying a stylus signal on a second axis, e.g. the column axis. Hand 142 may overlap conductive strips 156 that do not carry a stylus signal along the second axis. In other exemplary embodiments, hand 142 may overlap conductive strips 158 and may not overlap conductive strips 157.

Alternatively, a finger from the other hand or the other hand may touch conductive strips along one of the axes.

Amplitude of output 220 detected from conductive strips 157 in the frequency of emission from stylus 120 may be due to input derived from the presence of hand 142 (or finger 140), stylus signal 200 as well as noise in the surrounding environment. Amplitude of an output 210 detected from conductive strips 158 in the frequency of emission may be due to stylus signal 200 and noise. Since hand 142 does not overlap conductive strips 158, output 210 is free from interference due to hand 142.

Although both conductive strips 157 and 158 may include noise from other sources, the contribution of hand 142 to the amplitude or energy of output 220 in a frequency of stylus emission may be significant. Amplitude detection, e.g. of amplitudes of outputs 210 and 220 is used both to track the position of the stylus and decode data encoded on signal 200. Optionally, stylus identification code, tip status, button status and other data encoded in stylus signal 200 are detected based on amplitude detection. Inaccuracies in output received on conductive strips 157 may lead to inaccuracies in detecting position as well as loss of data encoded in stylus signal 200.

Figure 3A:
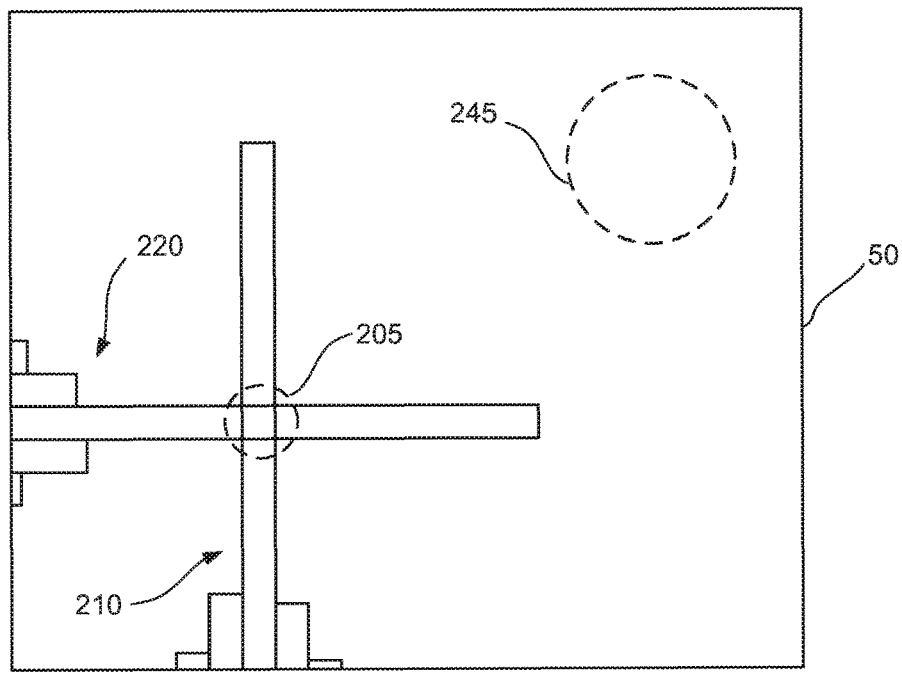
FIGS. 3A and 3B are simplified graphical representations of exemplary stylus based output and concurrent exemplary finger based output while there is no stylus signal interference from a touching hand in accordance with some embodiments of the present disclosure.
Figure 3B:
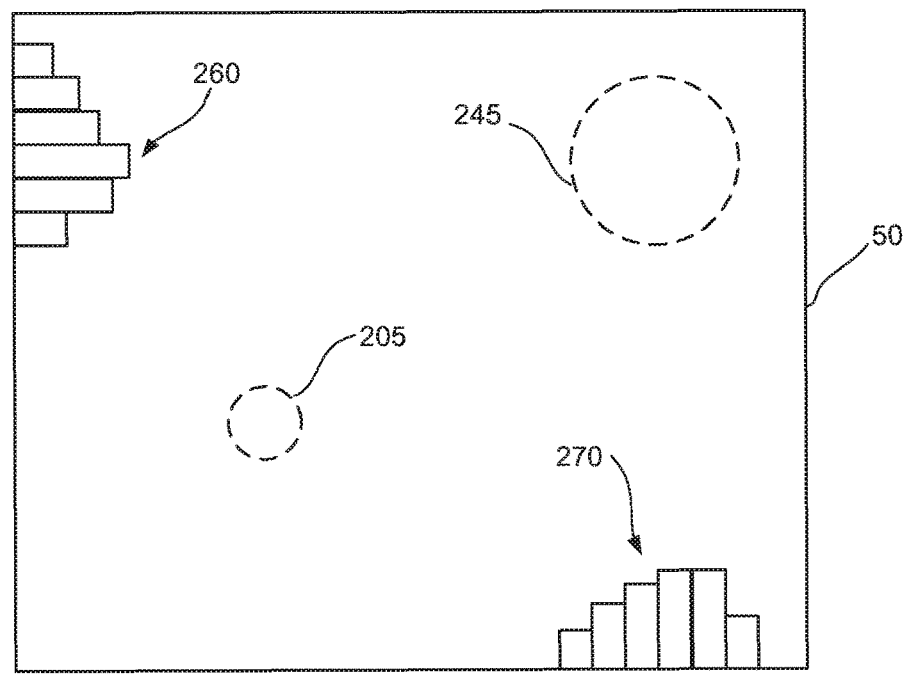

Reference is now made to FIGS. 3A and 3B showing simplified graphical representations of exemplary stylus based output and concurrent exemplary finger based output while there is no stylus signal interference from a touching hand in accordance with some embodiments of the present disclosure. When an area of hand input 245 is distanced from an area of stylus input 205 in both the row and column direction of digitizer sensor 50, hand input 245 will typically not interfere with detection of stylus input. Stylus input 205 is detected during stylus based detection (FIG. 3A) and hand input 245 is detected during finger based detection (FIG. 3B).

During stylus based detection, output 220 may be detected on row conductive strips 57 (FIG. 1) and output 210 may be detected on column conductive strips 58 (FIG. 1). Output 210 and output 220 represent energy level or amplitude of a signal detected on each of the conductive strips. Typically, output from a stylus 120 may be a relatively high energy signal with a narrow peak due to the typically narrow dimensions of tip 20. Coordinates of stylus input 205 may be determined based on output 210 and output 220. Typically, interpolation is applied to achieve sub-grid resolution.

During finger based detection (FIG. 3B), output 260 and output 270 related to hand touch 245 may be detected based on self-capacitive or mutual capacitive detection while signal 200 transmitted at stylus interaction location 205 will typically not be detected. Output 260 and output 270 from hand input 245 is typically a relative effect defined as a ratio of sampled output detected with hand input 245 over sampled output detected without hand input.

Dimensions of a finger 140 or a hand 142 is typically wider than that of a tip 20 of stylus 120 and therefore output 260 and output 270 associated with hand input 245 spreads over more conductive strips as compared to output 220 and output 210. Output 260 and output 270 typically have a peak shape and coordinates of hand input interaction 245 is determined based peaks of the output. Interpolation is also typically applied to determine finger touch coordinates.

Figure 4A:
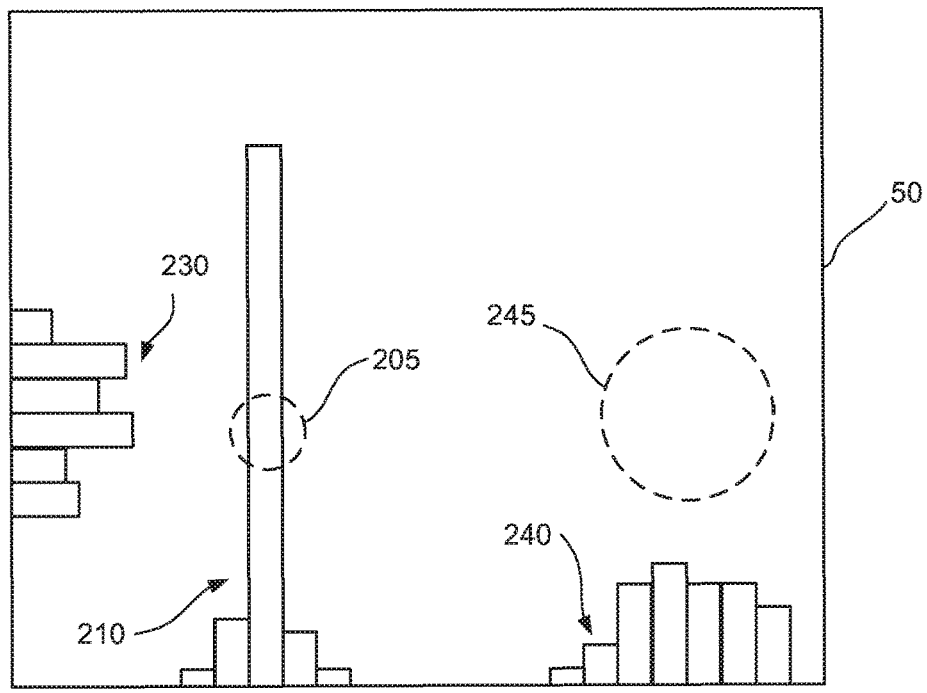
FIGS. 4A and 4B are simplified graphical representations of exemplary stylus based output and concurrent exemplary finger based output while a hand is coupled with sensing lines receiving a stylus signal on one axis and is not coupled with sensing lines receiving the stylus signal along the other axis in accordance with some embodiments of the present disclosure.
Figure 4B:
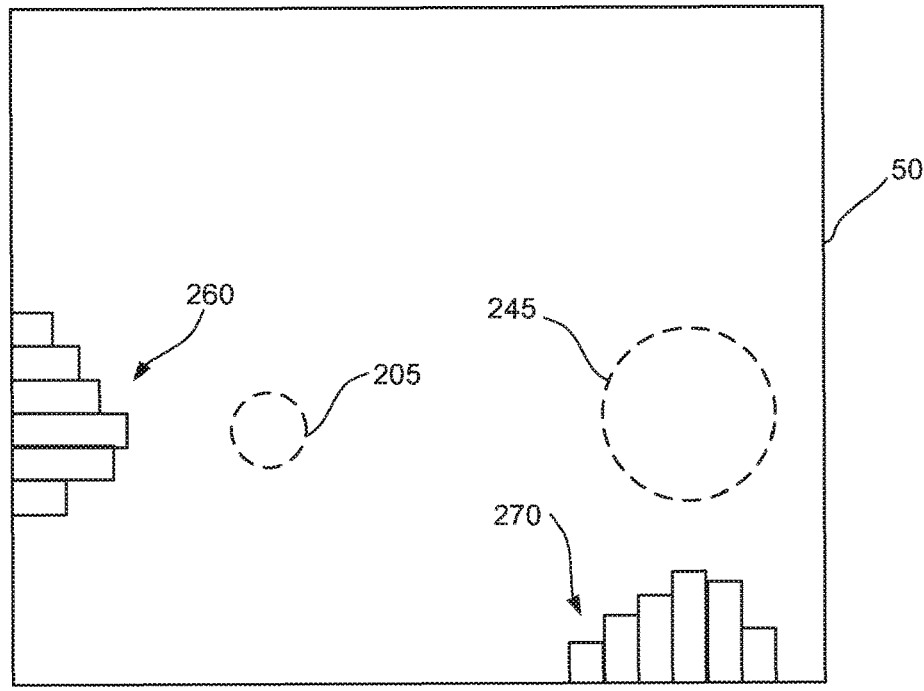

Reference is now made to FIGS. 4A and 4B showing simplified graphical representations of exemplary stylus based output and concurrent exemplary finger based output while a hand is coupled with sensing lines receiving a stylus signal on one axis and is not coupled with sensing lines receiving the stylus signal along the other axis in accordance with some embodiments of the present disclosure. When hand input 245 coincides with stylus input 205 on one axis, e.g. row axis as shown in FIG. 4A, the hand may pick up a stylus signal transmitted on the coinciding conductive strip and then inject that signal back on to conductive strips capacitive coupled with the hand. The signal injected back onto the conductive strip from the hand typically has an 180° phase shift or close to 180° phase shift, with respect to signal that was picked up directly from the stylus. During stylus based detection (FIG. 4A), output 240 corresponding to hand input 245 and output 210 corresponding to stylus input 205 may be detected on one axis and output 230 corresponding to both hand input 245 and stylus input 205 may be detected on the other axis. In addition, hand input 245 is detected in finger based detection (FIG. 4B) based on output 270 on one axis and output 260 on the other axis. According to some exemplary embodiments, self-capacitive detection is applied for the finger based detection since self-capacitive detection may be used to identify all conductive strips coupled with the hand. Optionally, mutual capacitive detection may also be performed to identify coordinates of multiple hand input.

At times, energy of output 230 may be significantly less than energy of output 220 (FIG. 3A) detected with no interference from hand input 245. This is due to the phase shift between the stylus signal directly picked-up from the stylus and the parasitic signal picked up from the hand. The anti-phase of the signal that the conductive strips pick up from the hand is destructive to signal that is picked up directly from the stylus. In addition, output 230 is typically spread over more conductive strips due to the wider dimensions of hand input 245 as compared to stylus input 205. Interference due to hand input 245 may make it difficult to provide an accurate coordinate determination in the axis that includes the interference.

According to exemplary embodiments of the present disclosure, a stylus signal on the axis including hand input may be estimated based on output 210 detected during stylus based detection and output 260 detected during finger based detection and output 270 detected finger based detection. The stylus signal estimated may be used in place of output 230 to detect coordinates of the stylus on that axis.

According to some exemplary embodiments, outputs 210, 260 and 270 may be compared to a pre-defined inter axis impedance ratio to estimate or predict output on the axis including interference, e.g. the row axis in FIG. 4A. The inter axis impedance ratio is typically stable for both stylus based detection and finger based detection and is typically a function of physical characteristics of the digitizer sensor and its topology. The inter axis impedance ratio, K may be defined by the following equation:

$$K=(Px/Py)/(Fx/Fy) \quad \text{Equation (1)}$$

Where:
Px is the peak energy detected in output 210;
Py is the array of energies to be estimated (in place of output 230);
Fx is maximum finger effect in outputs 270; and
Fy is the array of finger effects in outputs 260.

The length of the Py array and the Fy array are assumed to be the same since it is dependent on the dimension of the touch on a same axis. According to some exemplary embodiments, K is estimated for computing device during a dedicated calibration procedure that may be carried out during start up of the system or at a manufacturing site and then stored in memory associated with circuit 25 or host 22. During stylus detection, interference due to hand touch on one axis may be overcome by estimating Py using the following relationship:

$$Py=(Px/K)/(Fx/Fy) \quad \text{Equation (2)}$$

Figure 5:
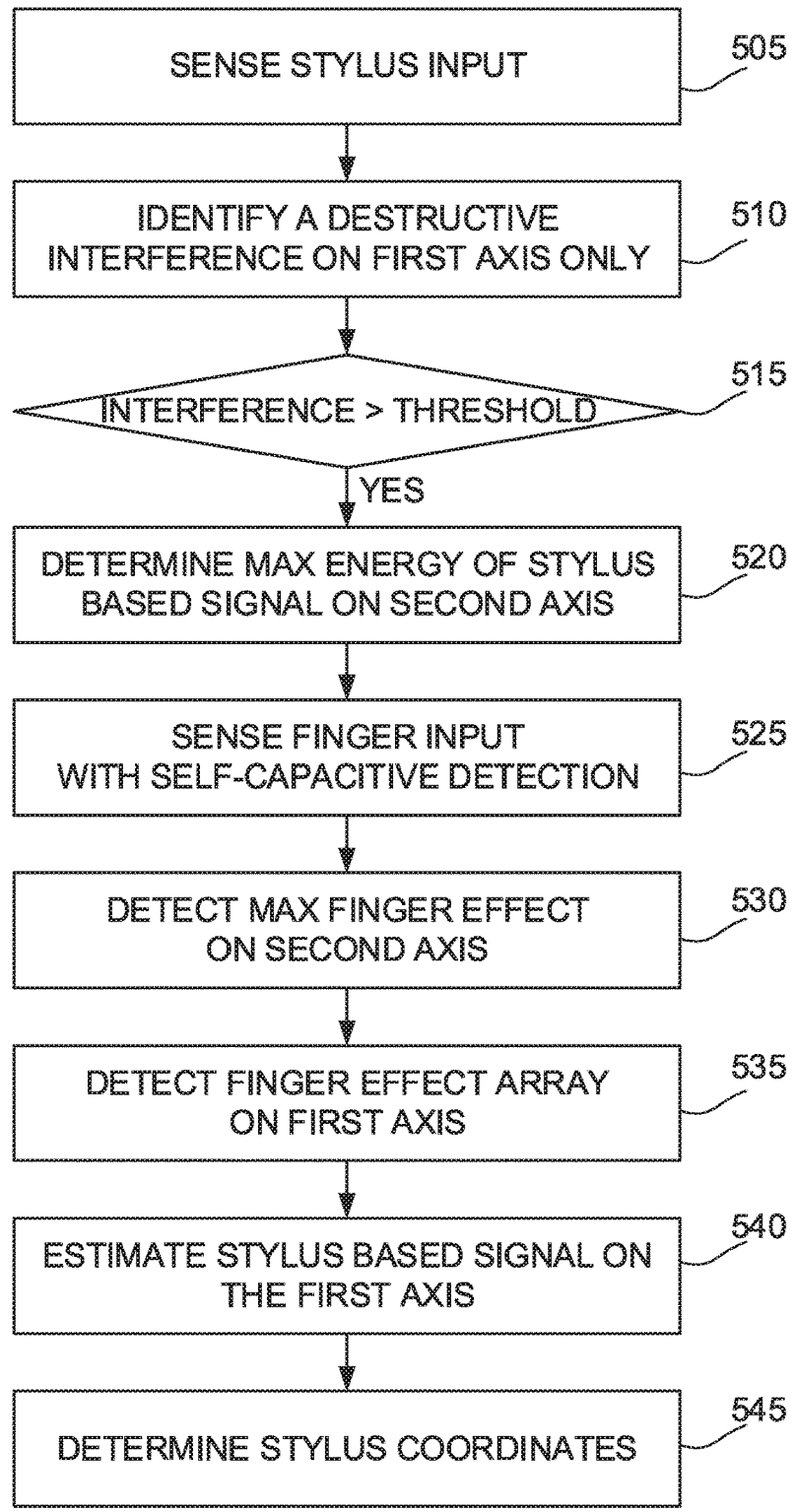
FIG. 5 is a simplified flow chart of an exemplary method for determining coordinates of stylus interacting with a digitizer sensor in accordance with some embodiments of the present disclosure.

Reference is now made to FIG. 5 showing a simplified flow chart of an exemplary method for determining coordinates of stylus interaction in accordance with some embodiments of the present disclosure. A stylus enabled computing device senses stylus input with a digitizer sensor (block 505). The digitizer sensor is typically a grid based capacitive sensor. Typically, the digitizer system detects the stylus input on both axes of the grid based sensor and location of the stylus on the digitizer sensor is determined. At times, the stylus signal detected on one axis of the digitizer sensor includes destructive interference due to hand touch or otherwise is significantly nosier than the stylus signal detected on the other axis of the digitizer sensor. The destructive interference may cause a significant reduction in energy of the signal detected and may also smear the stylus signal over more sensing lines on the digitizer sensor. In some exemplary embodiments, a circuit 25 associated with the digitizer sensor 50 identifies destructive interference on one axis and not the other axis (block 510) and evaluates severity of the interference. Optionally, peak energy or spread of the detected signal on each axis is compared and a difference of more than a threshold may be used as an indication that the destructive interference is significant. Optionally, detected jittering of the stylus during tracking may be used as an indication of a severity of the destructive interference. Optionally, jittering above a defined threshold initiates corrective measures. Corrective measures are typically initiated in response to an indication of the interference exceeding a threshold (block 515). In some exemplary embodiments, a level of interference may be applied to estimate a grounding state of the computing device and the grounding state may be reported to the device.

In some exemplary embodiments, in response to detecting a threshold level of interference, maximum energy of stylus signal detected on second axis, e.g. the clean axis (block 520) is determined. In a subsequent sampling window, finger input is detected with self-capacitive detection (block 525). Based on output from the self-capacitive detection, peak finger effect is detected on second axis (block 530) and a relative effect (or finger effect) array is detected on first axis, e.g. the blocked axis (block 535). The stylus signal on the axis including the interference (the blocked axis) may then be estimated based on the parameters detected (block 540) and the stylus coordinates may be determined based on the estimated stylus signal on the first axis (the blocked axis) and the stylus signal detected on the second axis (the clean axis) (block 545).

Figure 6:
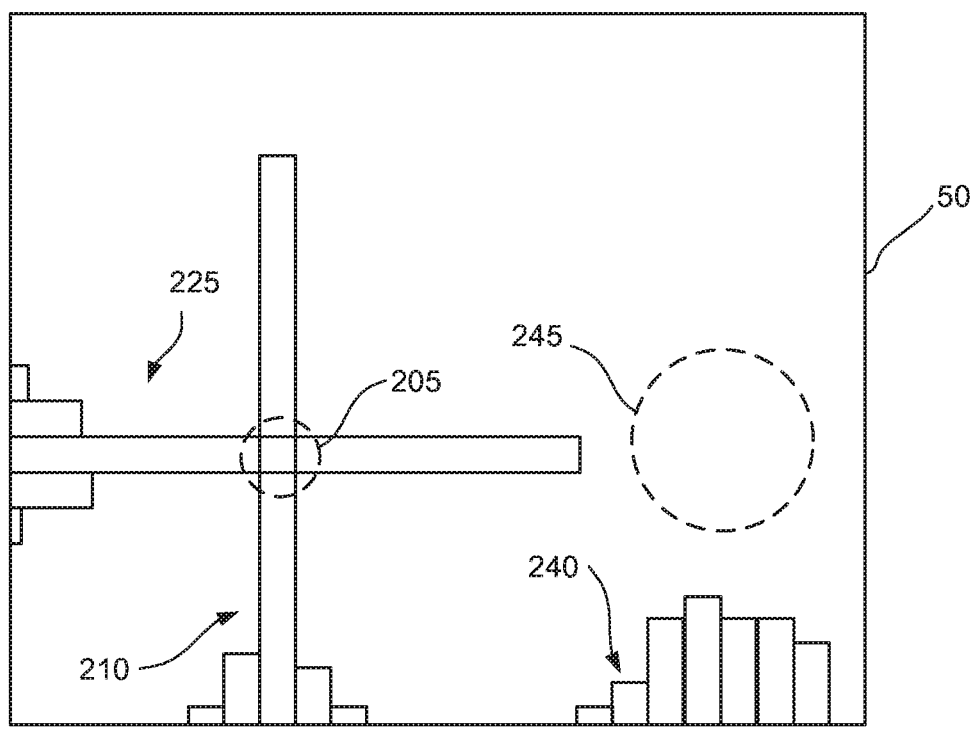
FIG. 6 is a simplified graphical representation of exemplary stylus based output, post compensation in accordance with some embodiments of the present disclosure.

Reference is now made to FIG. 6 showing a simplified graphical representation of exemplary stylus based output post compensation in accordance with some embodiments of the present disclosure. According to some exemplary embodiments, the estimated output 225 may be used in place of output 230 to determine coordinates of stylus input 205. According to some exemplary embodiments, the estimated output 225 is determined based on parameters detected during stylus based detection and finger based detection as well as based a pre-defined inter axis impedance ratio as described herein.

An aspect of some exemplary embodiments provides for a method comprising: detecting a signal on first electrodes along a first axis of a digitizer sensor and on second electrodes along a second axis of the digitizer sensor, wherein the signal is a signal transmitted by a handheld device interacting with the digitizer sensor; detecting hand input on the first electrodes and on third electrodes along the second axis and detecting no hand input on the second electrodes, wherein the hand input detection is based on self capacitive detection; estimating the signal transmitted by the handheld device on the first electrodes based on the hand input detected on each of the first and third electrodes, the signal from the handheld device detected on the second electrodes and based on a pre-defined constant; determining coordinates of the handheld device based on the signal detected on the second electrodes and the signal estimated the first electrodes; and reporting the coordinates to a host computing device associated with the digitizer sensor.

Optionally, the pre-defined constant is an inter axis impedance ratio.

Optionally, the ratio is defined based on accumulated empirical data detected while a hand is coupled to sensing lines along one axis that carry a stylus signal and not coupled to sensing lines along the other axis that carry a stylus signal.

Optionally, the ratio relates output detected during stylus detection and corresponding output detected during self-capacitive detection.

Optionally, the parameter is defined for a specific touch enabled computing device.

Optionally, the parameter is stored in the host computing device or in a circuit associated with the digitizer sensor.

Optionally, the method includes evaluating interference due to the hand input and initiating the estimating based on determining that the interference is above a defined threshold.

Optionally, the evaluating is based on comparing detected peak energy of stylus signal on each of the axis.

Optionally, the method includes estimating the grounding state of a device including the digitizer sensor based on the comparing.

Optionally, the evaluating is based on a parameter defining jitter during tracking.

An aspect of some exemplary embodiments provides for a device comprising: a display; a controller configured to display ink on the display; a digitizer sensor associated with a sensing surface; and a circuit associated with the digitizer sensor and configured to: detect a signal on first electrodes along a first axis of a digitizer sensor and on second electrodes along a second axis of the digitizer sensor, wherein the signal is a signal transmitted by a handheld device interacting with the digitizer sensor; detect hand input on the first electrodes and on third electrodes along the second axis and detecting no hand input on the second electrodes, wherein the hand input detection is based on self capacitive detection; estimate the signal transmitted by the handheld device on the first electrodes based on the hand input detected on each of the first and third electrodes, the signal from the handheld device detected on the second electrodes and based on a pre-defined constant; determine coordinates of the handheld device based on the signal detected on the second electrodes and the signal estimated the first electrodes; and report the coordinates to the controller.

Optionally, the pre-defined constant is an inter axis impedance ratio.

Optionally, the ratio is defined based on accumulated empirical data detected while a hand is coupled to sensing lines along one axis that carries a stylus signal and not coupled to sensing lines along the other axis that carries a stylus signal.

Optionally, the ratio relates output detected during stylus detection and corresponding output detected during self-capacitive detection.

Optionally, the parameter is defined for a specific touch enabled computing device.

Optionally, the parameter is stored in memory associated with the circuit or in memory associated with the controller.

Optionally, the circuit is configured to evaluate interference due to the hand input and initiate the estimating based on determining that the interference is above a defined threshold.

Optionally, the circuit is configured to evaluate the interference based on comparing detected peak energy of stylus signal on each of the axis.

Optionally, the circuit is configured to estimate the grounding state of the device based on the comparing.

Optionally, the circuit is configured to evaluate the interference based on a parameter defining jitter during tracking.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A method comprising:
   detecting a signal on first electrodes along a first axis of a digitizer sensor and on second electrodes along a second axis of the digitizer sensor, wherein the signal is a signal transmitted by a handheld device interacting with the digitizer sensor;
   detecting hand input on the first electrodes and on third electrodes along the second axis and detecting no hand input on the second electrodes, wherein the hand input detection is based on self capacitive detection;
   estimating the signal transmitted by the handheld device on the first electrodes as a pre-defined constant multiplied by a peak gain of the signal on the second axis and by a ratio of finger effects detected from the hand input, wherein the ratio is a first finger effect along the first axis over a second finger effect along the second axis;
   determining coordinates of the handheld device based on the signal detected on the second electrodes and the signal estimated on the first electrodes; and
   reporting the coordinates to a host computing device associated with the digitizer sensor.

2. The method of claim 1, wherein the pre-defined constant is an inter axis impedance ratio.

3. The method of claim 2, wherein the ratio is defined based on accumulated empirical data detected while a hand is coupled to sensing lines along one axis that carry a stylus signal and not coupled to sensing lines along the other axis that carry a stylus signal.

4. The method of claim 2, wherein the ratio relates output detected during stylus detection and corresponding output detected during self-capacitive detection.

5. The method of claim 2, wherein the pre-defined constant is defined for a specific touch enabled computing device.

6. The method of claim 2, wherein the pre-defined constant is stored in the host computing device or in a circuit associated with the digitizer sensor.

7. The method of claim 1, comprising evaluating interference due to the hand input and initiating the estimating based on determining that the interference is above a defined threshold.

8. The method of claim 7, wherein the evaluating is based on comparing detected peak energy of stylus signal on each of the axis.

9. The method of claim 8, comprising estimating the grounding state of a device including the digitizer sensor based on the comparing.

10. The method of claim 7, wherein the evaluating is based on a parameter defining jitter during tracking.

11. The method of claim 1, wherein the first finger effect along the first axis is an array of finger effects.

12. The method of claim 1, wherein the second finger effect along the second axis is a peak finger effect detected with output from the self-capacitive detection.

13. The method of claim 1, wherein the signal estimated on the first electrodes is an array signals, from which a coordinate along the first array is determined.

\* \* \* \* \*